United States Patent Office 3,465,297

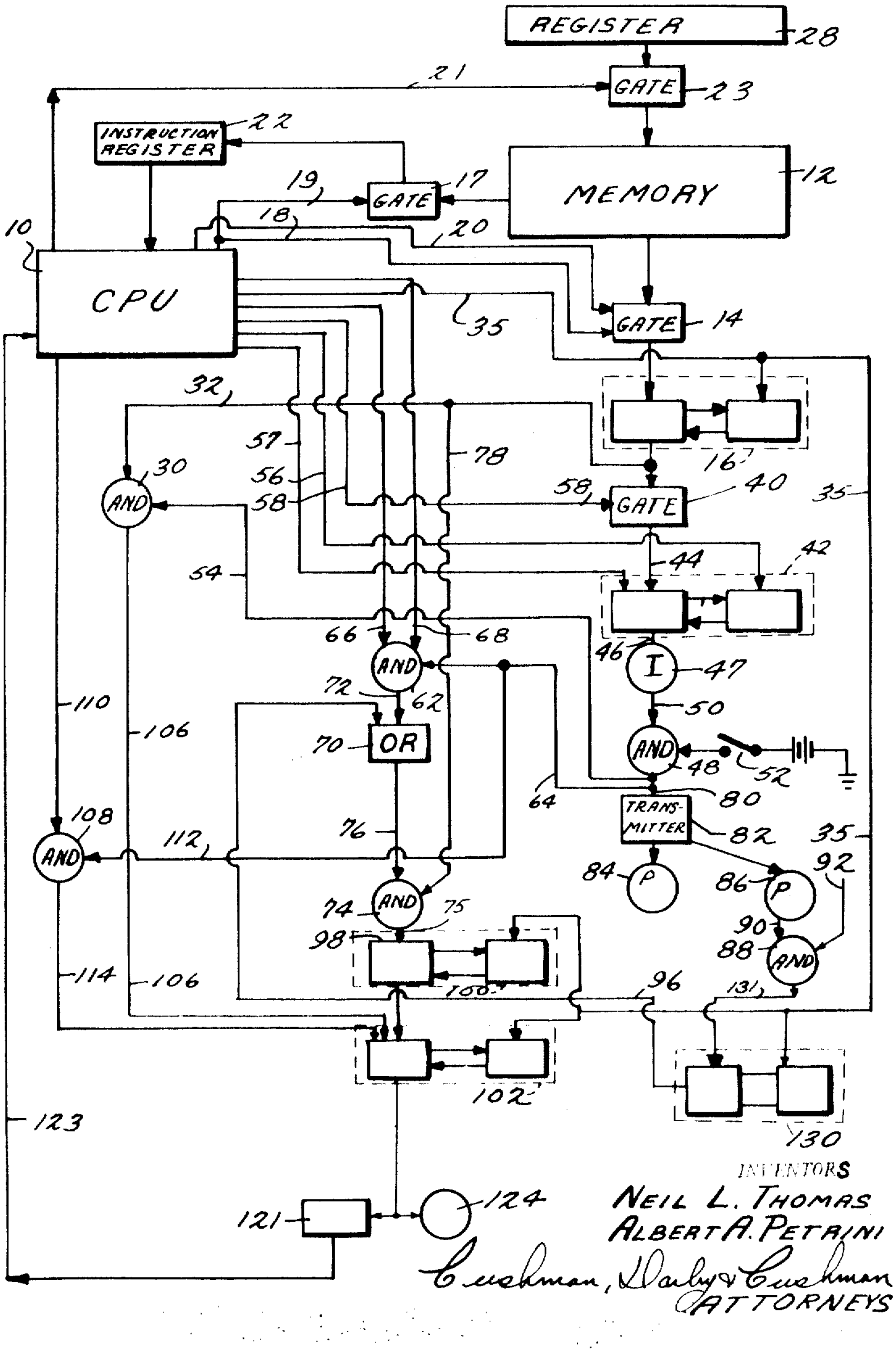
INVENTORS
NEIL L. THOMAS
ALBERT A. PETRINI
ATTORNEYS

Patented Sept. 2, 1969

3,465,297

PROGRAM PROTECTION ARRANGEMENT

Neil L. Thomas, Minneapolis, Minn., and Albert A. Petrini, San Diego, Calif., assignors to Control Data Corporation, Minneapolis, Minn., a corporation of Minnesota Filed Sept. 30, 1966, Ser. No. 583,386

Int. Cl. G06f *13/08*

U.S. Cl. 340—172.5 2 Claims

ABSTRACT OF THE DISCLOSURE

Apparatus for preventing a nonprotected computer program from interfering with a protected program. The class of program, protected or nonprotected, is established in accordance with the presence or absence, respectively, of bit information in particular locations of a program word or words. The bits of information from separate locations of a program word, or words, are held in separate storing means. A logic network is connected to the storing means to perform a comparison of the stored information and to produce an output whenever a nonprotected program attempts to interfere with a protected one.

This invention relates to apparatus for protecting a computer program from nonprotected programs and, in particular, this invention relates to improved apparatus for providing the following forms of protection for a protected computer program:

(1) Any attempt by a nonprotected program instruction to transmit information into a protected storage location is indicated and prevented;

(2) Any attempt to transfer information into a protected storage location from a piece of equipment peripheral to the central computing unit is also prevented whenever a nonprotected instruction is the ultimate source of the attempt;

(3) Any attempt to execute a protected instruction following the execution of a nonprotected instruction is also prevented, with one exception occurring whenever a program interrupt causes this sequence of instructions; and (4) Any attempt to execute instructions relating to interrupt programs or the state of the protect bits in storage are also prevented whenever these instructions are nonprotected.

The program protect system is built around a protect bit contained in each word of storage which is SET to ONE when the word is an operand or instruction of the protected program. Thus, all operand and instruction locations of the protected program must have the program protect bit SET. None of the instructions or operands of the nonprotected program can have the program protect bit SET. Whenever a violation of the program system is detected, an indicator is SET by an internal interrupt, which takes an action appropriate to the particular violation of the program protect system.

Thus, it is a primary object of this invention to protect one class of programs from a second class of programs where each class may contain one or more programs and where the first class contains only protected programs and the second contains only nonprotected programs.

A further object of this invention is to provide apparatus to prevent the manipulation of protected computer programs by nonprotected programs.

It is a further object of this invention to provide apparatus for preventing nonprotected programs from doing anything which affects the execution of program interrupts and thereby prevent a nonprotected program from blocking an interrupt which may be vital to a protected program.

Other objects and advantages of this invention will become apparent upon reading the appended claims in conjunction with the following detailed description and the attached drawing which illustrates in block diagram form the preferred embodiment of the invention.

Referring to the drawing, there is shown a central processing unit (CPU) 10 from which issues various commands as the computer steps through each cycle of its operation, these commands being dependent on the programs stored in the memory 12. The following description relating to the operation and relation of the CPU 10 to the memory 12 is given as background to the invention, it being understood that this description will be in very general terms.

Memory 12 stores both the instructions and operands of the protected and unprotected programs. Of course, it is possible that the protected and unprotected programs may be stored in a plurality of memories. A bit of each memory location is reserved for indicating the status thereof—that is, whether the memory location is protected or unprotected. For instance, if each memory location is 18 bits long, bit 17 may be chosen to represent the protected status of the particular memory location. This will be assumed for the remainder of the description of the invention.

The 17th bit of the words read from memory 12 pass through gate 14 to the SET input of flip-flop 16. The flow of information from memory 12 to flip-flop 16 through gate 14 is controlled by signals applied over line 18 which is connected to line 19. On line 19 occurs the command to read the current instruction from memory 12. Thus, this command will also gate the current instruction from memory 12 to instruction register 22 where the instruction is decoded by CPU 10 for execution thereof.

Before the instruction is executed, a command is issued on line 20 to gate the operand program protect bit from memory 12 to flip-flop 16. If the instruction causes a transfer of data into memory 12 and if no violation occurs then the data is transferred to memory 12 via gate 23 which is controlled by an appropriate control signal over line 21 from CPU 10.

There are four types of program protect violations which may occur which must be protected against, these having been stated hereinbefore. The first of these violations occurs whenever a nonprotected instruction attempts to write in a protected storage location. This will be called Violation No. 1. The second of these violations occurs whenever an attempt is made to write into a protected storage location via external storage access when a nonprotected instruction is the ultimate source of the attempt. This will be termed Violation No. 2. Violation No. 3 occurs whenever an attempt is made to execute a protected instruction following the execution of a nonprotected instruction, with the exception that whenever an interrupt causes this sequence of instructions, there is no violation. Violation No. 4 occurs whenever an attempt is made by an unprotected program to execute instructions which relate to interrupt programs or which relate to the setting or clearing of the program protect bit.

As is well known, the processing of each instruction of a computer program may be typically broken down into two cycles. During the first cycle, the current instruction is read from the computer memory and placed in the instruction register 22 for decoding thereof. After decoding, the second cycle, which basically consists of the execution of the current instruction, commences.

As will be described in more detail hereinafter, the Violation No. 3 check preferably occurs during the first cycle of the processing of the current instruction because, at this time, information is available as to the program protect status of both the current and last (that is, the instruction previous to the current instruction) instruction as is required for the Violation No. 3 check.

Checks for Violations Nos. 1, 2, and 4 do not need information as to the program protect status of the last instruction and, therefore, these checks are made during the second processing cycle of the current instruction. Hence, an efficient, economical arrangement is provided whereby the same, to some extent, circuitry may be employed for all violation checks as will be brought out in more detail hereinafter.

The SET output of flip-flop 16 is connected to an AND circuit 30 via line 32, and thus, over line 32, AND circuit 30 is able to detect the status of the current instruction which is required whenever a Violation No. 3 check is made. The SET output of flip-flop 16 is also connected to a gate 40. Flip-flop 16 stores the status of the current instruction as during the first instruction processing cycle. The output of gate 40 is connected to the SET input of flip-flop 42 via line 44.

The purpose of flip-flop 42 is to store the protect status of the last instruction while a check is being conducted for Number 3 violations—that is, during the first instruction processing cycle. However, as will become more apparent hereinafter, flip-flop 42 stores the status of the current instruction while Violations Nos. 1, 2, and 4 checks are being conducted—that is, during the second instruction processing cycle. Thus, the SET output 46 of flip-flop 42 is fed to AND circuit 48 via inverter 47, line 50. AND circuit 48 is connected to a program protect switch 52, which is preferably located on the computer console. Whenever 52 is closed, the output of AND circuit 48 passes a signal over line 54 to AND circuit 30 indicating the status of the last instruction. This information, together with the information as to the current instruction on line 32, conditions AND circuit 30 to provide a signal indicative of the existence or nonexistence of Violation No. 3. Flip-flop 42 is cleared via signal occurring on line 56 from the CPU 10, this clearing signal occurring when the execute cycle of the instruction begins. Slightly after flip-flop 42 is cleared, a signal on line 58 gates the status of the current instruction through gate circuit 40 to flip-flop 42. Thus, after the Violation No. 3 check is finished, flip-flop 42 stores the program protect status of the current instruction which will be needed for the check violations of 1, 2, and 4, whereas previously flip-flop 42 had stored the status of the last instruction for Violation No. 3, as stated hereinbefore.

The output of AND circuit 48 is also connected to line 64 which, in turn, is connected to AND circuit 62, this AND circuit determining the presence of Violation No. 1, which occurs whenever a nonprotected program instruction attempts to write into a protected storage location. Lines 66 and 68 are respectively provided from the CPU 10 with information as to (1) whether the memory 12 is active serving CPU 10 and (2) whether a WRITE command has resulted from the instruction in register 22.

The output from AND circuit 62 is fed through OR circuit 70 over line 72 and the output of OR circuit 70 is connected to AND circuit 74 via line 76. AND circuit 74 is also conditioned by the SET output of flip-flop 16 over line 78, the information on line 78 providing the status of the operand of the WRITE instruction in instruction register 22. As stated hereinbefore, flip-flop 16 contains the program protect status of the operand of the current instruction during the second processing cycle of the instruction, the status of the instruction itself being stored by flip-flop 16 during the first instruction processing cycle. Thus, AND circuit 74 together with AND circuit 62 provide an output on line 75 indicative of the existence or nonexistence of Violation No. 1. That is, since Violation No. 1 requires information as to the program protect status of the current instruction, together with information on the program protect status of the operand of the current instruction, and since this information is provided to the inputs of AND circuit 74, the output of AND circuit 74 is indicative of the existence or nonexistence of Violation No. 1.

The existence or nonexistence of Violation No. 2 is also available at the output of AND circuit 74 as will now be described. The output of AND circuit 48 is transferred to transmitter 82. Transmitter 82 provides the status of the current instruction to a plurality of peripheral equipments, at least two of which are indicated at 84 and 86. This peripheral equipment can constitute various sorts of input and output devices such as magnetic or paper tape drives, card readers or punches, or various optical equipment, etc. The protect status of the current instruction is fed to AND circuit 88 via line 90 from peripheral equipment 86 while the fact that an external WRITE instruction is within the instruction register 22 is transferred over line 92. Assuming all the input conditions of AND circuit 88 are satisfied, flip-flop 130 in peripheral device #2 is set via line 131. Each peripheral device has such a flip-flop. Subsequently whenever peripheral device #2 attempts to write into storage via external storage access the set output of flip-flop 130 is transferred over line 96 to OR circuit 70. Thus, the AND circuit 74, together with AND circuit 88, determine the existence of a Violation No. 2 check, this check requiring (1) the program protect status of the WRITE instruction (as stored in flip-flop 130) which was the ultimate source of the attempt to transfer information from a peripheral source to a location in memory 12 and (2) the program protect status of the location into which the data is being transmitted.

The output of AND circuit 74 is fed to the SET input 98 of storage protect fault flip-flop 100. Thus, flip-flop 100 is SET whenever Violation No. 1 or No. 2 occurs. The SET output of flip-flop 100 is transferred to the SET input of flip-flop 102, flip-flop 102 being SET whenever any of the Violations 1 through 4 occur. Violation 3 sets flip-flop 102 via line 106 and Violation 4 sets flip-flop 102 via line 114.

The circuitry necessary for detecting Violation No. 4 includes AND circuit 108, one input of which is connected to the CPU via line 110. Line 110 is energized whenever the current instruction in register 22 is decoded to be one which has anything to do with interrupt programs (that is, enables, or disables, interrupts, or manipulates the interrupt mask register), or is decoded to be one which sets or clears the program protect bit of any storage location within memory 12. On line 112 is provided information as to the program protect status of current instruction and, thus, AND circuit 108 has the necessary information to provide on the output line 114 thereof a signal indicative of the existence or nonexistence of Violation No. 4. Line 114 is connected to the SET input of 102.

Flip-flops 100, 102 and 130 are all cleared at the end of an instruction cycle via a control signal over line 35 preparatory to the next instruction processing cycle. Of course, suitable means (not shown) are employed to delay the setting of flip-flop 16 until its content is gated to flip-flop 42.

The SET output of flip-flop 102 is connected to an internal interrupt circuit, indicated at 121, which is initiated whenever one of the program protect violations occurs, and is also connected to an indicator 124 to provide a display upon detection of a program fault. Interrupt circuit 121 is connected to CPU 10 by line 123 to provide an instruction signal to the computer whenever a violation is detected.

Having now described in detail the structure of the present invention, the operation thereof will be described with reference to the four possible protect violations.

As stated hereinbefore, processing of each computer instruction is broken down into two cycles, that is, (1) the readout of the current instruction from memory 12 under the control of CPU 10, and (2) the execution of the current instruction, once again under the control of CPU 10.

Since, as stated hereinbefore, Violation No. 3 check is performed during the first cycle of instruction processing, this violation check will be discussed first. Violation No. 3 occurs whenever an attempt is made to execute a protected instruction following the execution of a nonprotected instruction. The protected instruction is executed as a "nonprotected pass" instruction. It is not a violation, however, if an interrupt causes this sequence of instructions. However, for purposes of illustration, assume that the conditions necessary for the existence of Violation No. 3 occur.

Preparatory to the transfer of the program protect bit status of the current instruction of flip-flop 16, this flip-flop is cleared by an appropriately timed signal over line 35. The status of the current instruction is then gated to flip-flop 16 by a control signal on line 18. Flip-flop 42 contains the status of the last instruction, which is CLEAR since it is assumed that the last instruction was unprotected. The SET output 46 of flip-flop 42 is inverted by inverter 47, thereby to provide a ONE input to AND circuit 48 on line 50. It is assumed that program protect switch 52 is closed and thus the other input to AND circuit 48 also is a ONE. Thus, a ONE output occurs on line 54 and is applied to one of the inputs of AND circuit 30.

Since it is assumed that the current instruction is protected, the flip-flop 16 applies a ONE to the other input of AND circuit 30 over line 32. Thus a ONE output occurs on line 106 and is applied to the SET input of flip-flop 102. The output of flip-flop 102 is connected to interrupt circuit 121 and indicator 124.

The interrupt program will sense that Violation No. 3 has occurred by appropriate means (not shown) such as by sensing the output of AND circuit 30 and take the necessary steps to cause the protected instruction to be executed as a nonprotected pass instruction, that is, the next instruction indicated in the address register (not shown) of the computer is executed, the current instruction being treated as nonexistent. As stated hereinbefore, whenever an interrupt causes this sequence of instructions, no violation occurs. This is accomplished by setting flip-flop 42 from line 57 which is connected to CPU 10. Thus, whenever an interrupt occurs, CPU 10 generates a signal on line 57 which SETS flip-flop 42, thereby preventing flip-flop 42 from being in the CLEAR state, as is required for a Violation No. 3 check to be satisfied.

Assuming that no Violation No. 3 occurs, the processing of the current instruction steps to the second cycle wherein the instruction is executed. Assume first that this instruction is one which will cause a transfer of information from the register 28, for example, to the memory 12. Further assume that the instruction within register 22 is nonprotected while the memory location, into which the information is to be transferred, is protected.

Thus, at this point the status of the current instruction is within flip-flop 16. Further, flip-flop 42 is CLEAR, this flip-flop having been cleared by an appropriately timed control signal on line 56. Since the current instruction is not protected, the flip-flop 42 will remain in its CLEAR state after a gating signal is applied over line 58 to gate 40 to gate the SET output of flip-flop 16 to flip-flop 42. Thus, as the execute portion of the instruction cycle proceeds, the flip-flop 42 remains in its CLEAR state.

The SET output 46 of flip-flop 42 is inverted, thereby causing a ONE input to be applied to AND circuit 48. Since switch 52 is closed, a ONE input occurs at the output of AND circuit 48 and is applied to AND circuit 62 via line 64. It is assumed that the memory 12 is active servicing the CPU 10 and, therefore, line 66 has a ONE input thereon. Further, since it has been assumed that the instruction within register 22 is attempting to transfer information into memory 12, a ONE input will occur on WRITE line 68. Thus AND circuit 62 is conditioned and a ONE input is applied to OR circuit 70. The output of circuit 70 is applied over line 76 to AND circuit 74. Thus, one of the inputs to AND circuit 74 is satisfied.

It has been assumed that the current instruction is unprotected and that it is desired to transfer information into the memory 12. Before this transfer of information can be permitted, a determination must be made of the protect status of the memory location into which the information is to be transferred. At the same time that information is transferred to flip-flop 42 from flip-flop 16, the status of the operand of the instruction within register 22 is transferred to flip-flop 16. Since this operand is assumed to be protected, flip-flop 16 is SET, thereby applying a ONE input to line 78 and to AND circuit 74. Hence, both of the input conditions for AND circuit 74 are now satisfied and a ONE output is applied to storage protect fault flip-flop 100, which in turn sets flip-flop 102 to indicate that Violation No. 1 has occurred.

Instead of assuming that the instruction within register 22 is attempting to transfer information from a point inside the computer (such as register 28) into a storage location within memory 12, assume that the instruction sets up conditions in peripheral unit 86 such that it will subsequently attempt to transfer information from peripheral unit 86 into memory 12. Further, assume that the instruction within register 22 which set up these conditions in peripheral unit 86 is unprotected, while the storage location into which the information is to be subsequently transferred is protected. To some extent the conditions postulated for Violation No. 1 discussed hereinbefore are duplicated. Thus, the output from AND circuit 48 applies a ONE input to transmitter 82 which in turn supplies this information to peripheral equipments 84 and 86. Thus, a ONE input occurs on line 90 and is applied to AND circuit 88. Further, the CPU 10 will cause a ONE signal to occur on line 92 because of the particular instruction within instruction register 22. Hence, the input conditions for AND circuit 88 are satisfied and flip-flop 130 is set to a ONE via line 131. At a later time when peripheral unit 86 attempts to write into memory 12 via external storage access the SET output of flip-flop 130 is applied to OR circuit 70 via line 96 and thence to AND circuit 74 via line 76. Since the memory location into which the information is to be written has its protect bit SET the other input to AND circuit 74 will also be ONE as described hereinbefore with respect to Violation No. 1. Hence, flip-flop 102 is SET, as described hereinbefore.

Instead of an attempt to transfer information into the computer memory 12 from either an internal or an external source, assume that the instruction within register 22 is one which either (1) effects an interrupt operation, or (2) attempts to SET or CLEAR the program protect bit of one of the storage locations in memory 12. Further, assume that the instruction within register 22 is not protected. Since it is not protected, a ONE output will occur at AND circuit 48 as described hereinbefore with respect to Violation No. 1. This ONE output is applied over line 112 to AND circuit 108. Whenever any of the above-mentioned instructions occur, a ONE output also occurs on line 110 from the CPU 10. Thus, the input conditions for AND circuit 108 are satisfied and a ONE output occurs on line 114 which sets flip-flop 102, thereby causing an unprotected "pass" instruction, as described hereinabove with respect to Violation No. 3, this instruction being initiated by interrupt 121.

Thus, there has now been described apparatus for protecting a first (protected) class program stored in at least one computer memory (memory 12) from a second (nonprotected) class of programs, some of which are stored in the before mentioned computer memory. Typically, the computer requires at least two cycles to process each program instruction where during the first cycle the instruction is read from the computer memory and decoded and where during the second cycle the instruction is executed.

Each storage location of the memory 12 contains a bit of memory cell, where the bit indicates the class to which the storage location is assigned. First means (flip-flop 16) are responsive to the class indicating bit contents for storing the assigned class of the storage location currently being referenced. Thus, during the first instruction processing cycle, the flip-flop 16 contains the class indicating bit contents relating to the current instruction while during the second cycle the flip-flop 16 contains the class indicating bit contents relating to the operand of the current instruction.

Second means (flip-flop 42) are provided for storing the contents of the class indicating bit relating to the storage location referenced immediately previous to the currently referenced storage location. Thus, during the first instruction processing cycle, flip-flop 42 contains the class indicating bit contents relating to the last instruction; whereas, during the second instruction processing cycle, flip-flop 42 contains the class indicating bit contents relating to the current instruction.

Means (AND circuit 30) is provided which is responsive to both the storing means (flip-flops 16 and 42) for detecting the condition where the previous instruction belongs to the second (unprotected) class and the current instruction belongs to the first (protected) class. Means (indicator 124) is provided to indicate this condition in response to the detecting means (AND circuit 30) being satisfied.

Means (CPU 10 and line 57 connected to the SET input of flip-flop 42) are provided to prevent the indication of the before mentioned condition whenever the condition is caused by an interrupt program.

Means (CPU 10 and gate 40) are also provided for transferring the class indicating bit contents relating to the current instruction from the first storing means (flip-flop 16) to the second means (flip-flop 42) during the second instruction processing cycle. Also means (CPU 10 and gate 14) are provided for transferring the class indicating bit contents relating to the operand of the current instruction from the computer memory 12 to the first storing means (flip-flop 16) after the transfer of the class indicating bit contents relating to the current instruction to the second storing means (flip-flop 42). Means (AND circuits 62 and 74) responsive to both said storing means (flip-flops 16 and 42) are provided for detecting of the condition where the current instruction belongs to the second (nonprotected) class and the operand belongs to the first (protected) class. Indicator 124 is responsive to AND circuits 62 and 74 to provide an indication whenever this condition occurs.

Further, means (CPU 10 and line 110) are provided for indicating that the current instruction is attempting to manipulate one of the class indicating bits in the memory 12. And means (AND circuit 108) is provided, it being responsive to CPU 10 and the second storing means (flip-flop 42) to detect any attempts by an instruction belonging to the second (unprotected) class of programs to manipulate the class indicating bits. Indicator 124 is responsive to the detection of this attempt.

Although a single preferred embodiment of the present invention has been shown and described, it is to be understood that still further modifications thereof may be made without departing from the spirit and scope of the appended claims.

What is claimed is:

1. Apparatus for protecting a first class of program in a computer from a second class of program, the classes of programs being determined in accordance with the presence or absence, respectively, of bit information in particular locations of program words each of which include an instruction portion and an operand portion, comprising:

(a) a first means for storing the information content of a particular location of an instruction portion of a program word;

(b) a second means for storing the information content of a particular location of an instruction portion of another program word;

(c) logic means, including a first comparison arrangement connected to the first and second storing means and responsive to the presence of bit information in the first storing means and the absence of bit information in the second storing means to produce an output signal from the comparison arrangement;

(d) means for connecting said output signal from the first comparison arrangement to a central processing unit of the computer;

(e) means controlled by said central processing unit for gating the information content of the particular location of the instruction portion of the first-mentioned program word to said second storing means;

(f) additional means controlled by said central processing unit for gating the information content of a particular location of the operand portion of the first-mentioned program word from a computer memory to said first storing means;

(g) the logic means including a second comparison arrangement responsive to the presence of bit information in the first storing means and the absence of bit information in the second storing means to produce an output signal from the second comparison device;

(h) means for connecting said output from the second comparison device to said processing unit;

(i) means for connecting the second storing means to an external peripheral device;

(j) means for generating at the peripheral device, in response to information from the second storing means and the central processing unit, a signal representative of the readiness of the peripheral device to supply information to the computer; and (k) means for applying the readiness signal from the peripheral device to said second comparison device to produce an output therefrom responsive to the readiness signal and bit information from the first storing means.

2. Apparatus as set forth in claim 1, further comprising:

a third comparison arrangement connected to the central processing unit and the first-mentioned logic means, said third comparison arrangement being responsive to a signal from the processing unit representative of a special instruction and to the content of the second storing means to produce a further output signal which is applied to the central processing unit.

References Cited

UNITED STATES PATENTS

| | | | |
|---|---|---|---|
| 3,263,218 | 7/1966 | Anderson | 340—172.5 |
| 3,264,615 | 8/1966 | Case et al. | 340—172.5 |
| 3,271,744 | 9/1966 | Peterson et al. | 340—172.5 |
| 3,328,765 | 6/1967 | Amdahl et al. | 340—172.5 |
| 3,328,768 | 6/1967 | Amdahl et al. | 340—172.5 |

PAUL J. HENON, Primary Examiner

P. R. WOODS, Assistant Examiner